United States Patent [19]

Nakayama et al.

[11] Patent Number: 4,797,449
[45] Date of Patent: Jan. 10, 1989

[54] RESIN COMPOSITIONS

[75] Inventors: Takeo Nakayama, Ibaraki; Saburo Inoue, Toyonaka; Takurou Sakamoto, Kawanishi, all of Japan

[73] Assignee: Takeda Chemical Industries, Ltd., Osaka, Japan

[21] Appl. No.: 163,850

[22] Filed: Mar. 3, 1988

[30] Foreign Application Priority Data

Mar. 5, 1987 [JP] Japan .................................. 62-51048
Oct. 2, 1987 [JP] Japan .................................. 62-250467

[51] Int. Cl.⁴ .................................................. C08L 75/04
[52] U.S. Cl. .................................................. 525/217
[58] Field of Search ........................................ 525/217

[56] References Cited

U.S. PATENT DOCUMENTS 3,117,103  1/1954  Herbig et al. ..................... 525/217

Primary Examiner—Maurice J. Welsh
Attorney, Agent, or Firm—Wenderoth, Lind & Ponack

[57] ABSTRACT

A resin composition, which comprises (a) a copolymer containing isocyanate group prepared by subjecting a compound represented by the general formula

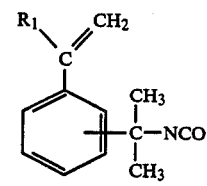

wherein $R_1$ stands for hydrogen or methyl group and an ethylenic unsaturated monomer to copolymerization, and (b) a copolymer containing amino group prepared by subjecting a compound represented by the general formula

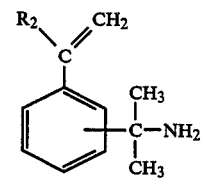

wherein $R_2$ stands for hydrogen or methyl group and an ethylenic unsaturated monomer to copolymerization, has a pot life of such an extent as for permitting them to be used as spray-coating, and the resulting film is excellent in flexibility, chemical resistance, water resistance and corrosion resistance, and, besides, rapid in curability, thus being useful as cold-drying coatings on metals, plastics, woods, inorganic materials, etc. and also as adhesives, etc. The resin composition is very good in compatibility, thus being useful in such a field as required high gloss and beautiful finish. Further, the amino group containing copolymer is of relatively high molecular weight, thus being of less toxicity, and, besides, substantially odorless, and, therefore, it causes no injurious problems to health and safety.

8 Claims, No Drawings

RESIN COMPOSITIONS

This invention relates to rapidly curable resin compositions.

The coating film obtained by the present invention is excellent in flexibility, chemical resistance, water-resistance and corrosion resistance, and, therefore, the resin compositions of the present invention are very useful as, among others, ambient temperature-drying coatings on metals, plastics, woods, inorganic meterials, etc.

It has been known that a coating prepared by combining a prepolymer having terminal isocyanate group with a nonaromatic primary diamine, the prepolymer being prepared by allowing an organic polyisocyanate having all the isocyanate group attached to non-benzenoid carbon atoms to react with a compound containing a reactive hydrogen, exhibits negligible discolouration and affords a rapidly hardening film (Specification of British Pat. No. 1,109,246).

However, the pot life of this composition is very short, and, after mixing the two liquids, the viscosity increases sharply. In several minutes, spray-coating becomes difficult, thus a special coating device, for example, a two-head gun is required for coating it continuously. Besides, the composition is of a high molecular weight and a relatively high viscosity is not well compatible with a relatively less viscous diamine and it is feared that this composition can hardly be used in the field where a high gloss finish is required. It should also be borne in mind that the above-mentioned diamines are of relativley low molecular weight and thus being high in toxicity and having distasteful odors.

In the above-mentioned patent specification, it is described that diamine is previously heated with a ketone and the resultant is added to a mixture of polyol and polyisocyanate to thereby prolong the pot life of the reaction mixture. As is known well, heating of diamine with a ketone produces ketimine. In a urethane resin composition containing such a ketimine compound, the ketimine compound reacts with moisture in, for example, air to reproduce diamine, and this diamine acts to allow the polyisocyanate to be polymerised, cross-linked and cured. Therefore, in a urethane resin composition containing a ketimine compound, the reaction of the ketimine compound with water is the rate-determining step of cross-linking reaction of polyisocyanate, hence the pot life of the urethane resin composition can be prolonged, while requiring a relatively long time for drying. Depending of the use conditions, it is feared to produce blushing.

The weatherability of this composition is relatively good, but not satisfactory against exposure for a long period, thus the composition having such drawbacks as being inconvenient for outdoor uses.

Further, in the case of producing a pigment coating, pigments are dispersed in a highly reactive urethane prepolymer, thus strict water-control being required. Thus-prepared pigmented coating has such a drawback as being poor in storage stability.

The present invention is to provide resin composition which can be coated by spraying and cured at relatively low temperatures and short time.

The present inventors have conducted diligent studies on resin compositions curable at low temperatures and in a relatively short period of time, and found that a resin composition comprising a copolymer containing isocyanate groups, prepared by copolymerization of an unsaturated monomer containing specific isocyanate groups shown by the general formula:

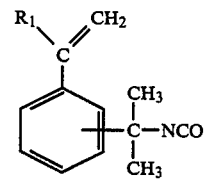

wherein $R_1$ stands for hydrogen or methyl group with an ethylenic unsaturated monomer and a copolymer containing amino groups, prepared by copolymerization of an unsaturated monomer containing specific amino groups shown by the general formula:

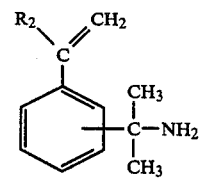

wherein $R_2$ stands for hydrogen or methyl group with an ethylenic unsaturated monomer is applicable by spray-coating to give a film curable at relatively low temperatures and in a ralatively short period of time. Based on this finding, the present invention has now been accomplished.

More specifically stating, the present invention relates to a resin composition, which comprises: (a) an isocyanate group containing copolymer prepared by subjecting a compound represented by the general formula:

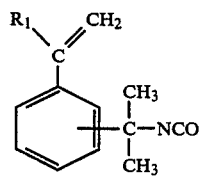

wherein $R_1$ stands for hydrogen or methyl group to copolymerization with an ethylenic unsaturated monomer, and (b) an amino group containing copolymer prepared by subjecting a compound represented by the general formula:

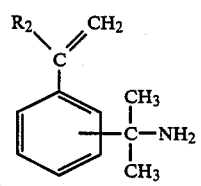

wherein $R_2$ stands for hydrogen or methyl group to copolymerization with an ethylenic unsaturated monomer.

Examples of the compound represented by the general formula:

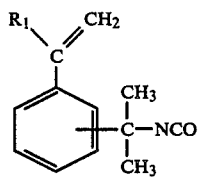

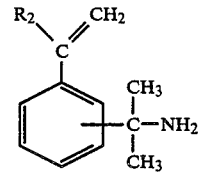

wherein $R_1$ stands for hydrogen or methyl group employable for the preparation of (a) an isocyanate group containing copolymer, include p-isopropenyl-α,α-dimethylbenzylisocyanate, m-isopropenyl-α,α-dimethylbenzylisocyanate, p-ethylenyl-α,α-dimethylbenzylisocyanate, m-ethylenyl-α,α-dimethylbenzylisocyanate, etc. Among these compounds, isopropenyl-α,α-dimethylbenzylisocyanate(hereinafter simply referred to as TMI) is especially preferable.

TMI monomer can be prepared by, for example, methods disclosed in U.S. Pat. Nos. 3,290,350 specification, 4,130,577, specification, 4,377,530, specification, 4,439,616 specification, etc.

The ratio of these compounds in the copolymers is usually within the range of from about 2 to 30 weight %, preferably, from about 5 to 20 weight %. When the ratio does not exceed 2 weight %, the cross-linking density of cured film and weatherability are, in some instances, not satisfactory. When the ratio exceeds 30 weight %, the pot life becomes relatively short and the cured film becomes brittle, in some instances.

Examples of the ethylenic unsaturated monomer copolymerizable with the above-mentioned compounds include acrylates such as methyl acrylate, ethyl acrylate, n-propyl acrylate, isopropyl acrylate, n-butyl acrylate, 2-ethylhexyl acrylate, 2-hydroxyethyl acrylate, isobornyl acrylate, butoxyethyl acrylate, ethylcarbitol acrylate, tetrahydrofurfuryl acrylate, perfluorooctylethyl acrylate, etc., methacrylates such as methyl methacrylate, ethyl methacrylate, n-propyl methacrylate, isopropyl methacrylate, n-butyl methacrylate, t-butyl methacrylate, 2-hydroxyethyl methacrylate, cyclohexyl methacrylate, isoboronyl methacrylate, trifluoroethyl methacrylate, perfluorooctylethyl methacrylate, etc., fumarates such as dimethyl fumarate, diethyl fumarate, di-n-butyl fumarate, etc., maleates such as dimethyl maleate, diethyl maleate, di-n-butyl maleate, etc., styrene monomers such as styrene, vinyl toluene, α-methyl styrene, etc., and, besides, vinyl acetate, vinyl propionate, vinyl chloride, vinylidene chloride, acrylonitrile, acrylamide, etc. Among the above mentioned monomers, acrylates and methacrylates are preferable in providing copolymers showing good weatherability and yellowing-resistance. In the copolymer, one or more species of the above-mentioned monomers may be allowed to be contained, and, the ratio in the copolymers is usually within the range of from about 98 to about 70 weight %, preferably within the range of about 95 weight % to about 80 weight %.

Examples of the compounds represented by the general formula:

wherein $R_2$ stands for hydrogen or methyl group which are employable for (b) amino group containing copolymers, another essential component of the resin compositions of the present invention, include p-isopropenyl-α,α-dimethyl benzylamine(hereinafter abbreviated as p-TMA), m-isopropenyl-α,α-dimethyl benzylamine (hereinafter abbreviated as m-TMA), p-ethylenyl-α,α-benzylamine, m-ethylenyl-α,α-benzylamine and a mixture thereof. Among these compounds, TMA is especially preferable. A TMA monomer can be prepared by, for example, the method disclosed in EP-A No. 127602 specification. The ratio of the above-mentioned compounds in the copolymers is usually within the range of from about 2 to about 30 weight %, preferably from about 5 to about 20 weight %.

As ethylenic unsaturated monomers polymerizable with the above-mentioned compounds, use is made of the compounds described as ethylenic unsaturated monomers copolymerized with compounds having the structure of the general formula (a) in the preparation of the above-mentioned isocyanate group containing copolymers.

The isocyanate group containing copolymers and the amino group containing copolymers employable for the present invention can be prepared by any one of the solution polymerization, bulk polymerization, suspension polymerization and emulsion polymerization in an inert solvent in the presence of a radical-generating polymerization initiator, but the solution polymerization in the absence of water is preferable.

Examples of the solvent include esters such as ethyl acetate, butyl acetate, cellosolve acetate, carbitol acetate, dimethylester of dibasic acid, etc., alcohols such as ethyl alcohol, n-propyl alcohol, isopropyl alcohol, etc., aromatic solvents such as toluene, xylene, Solvesso #100, Solvesso #150, etc., among others.

In general, the concentration of entire monomers is controlled within the range of from about 20 to about 80 weight %, and, as the polymerization initiator, use is made of a catalyst for producing an oil-soluble free radical, for example, α,α-azobis-isobutyronitrile, benzoyl peroxide, t-butyl hydroperoxide, cumene hydroperoxide, etc., and, upon necessity, use of a redox catalyst containing a suitable reducing substance is also possible. Further, as a molecular weight modifier, for example, a small amount of butyl mercaptane, dodecyl mercaptane, etc. may be added. The copolymerization is conducted in an inert gas under normal pressure at temperatures ranging from about 30° C. to 120° C.

Thus-obtained copolymer has at least one isocyanate group or amino group, and its weight-average molecular weight is in the range of from about 1,000 to about 500,000, preferably from about 5,000 to about 100,000.

The resin composition of the present invention can be obtained by mixing, when used, the isocyanate group containing copolymer with the amino group containing copolymer. The preferable mixture ratio is that the equivalent ratio of the isocyanate group in the isocyanate group containing copolymer and the amino group in the amino group containing copolymer is about 0.5 to about 2.0.

The resin compositions of the present invention thus obtained can be used as a solution of an organic solvent such as ethyl acetate, isopropyl alcohol, methyl ethyl ketone, toluene, xylene, etc. or as an emulsion dispersed in water. And, upon necessity, any other resin, stabilizers, plasticizers, pigments, etc. can be added.

When a pigment is used, it may be added, in advance, to either one of the isocyanate group containing copolymer or the amino group containing copolymer, but it is preferable to add the pigment to the amino group containing copolymer, because of less influence of the moisture in the pigment or inclusion of moisture in the dispersion step.

The resin compositions of the present invention thus obtained is advantageously used in the fields of, for example, coatings, adhesives, etc.

The resin compositions of the present invention have a pot life of such an extent as for permitting them to be used as spray-coating, and the resulting film is excellent in flexibility, chemical resistance, water resistance and corrosion resistance, and, besides, rapid in curability, thus being useful as cold-drying coatings on metals, plastics, woods, inorganic materials, etc. and also as adhesives, etc. The resin compositions of the present invention are very good in compatibility, thus being useful in such a field as requiring high gloss and beautiful finish. Further, the amino group containing copolymer employed for the present invention is of relatively high molecular weight, thus being of less toxicity, and, besides, substantially odorless, and, therefore, it causes no injurious problems to health and safety.

The following Examples and Comparative Examples will explain the present invention more concretely. In the Examples and Comparative Examples, "parts" and "%" are respectively on weight basis. Abbreviations have respectively the following meanings.
MMA: methyl methacrylate
EMA: ethyl methacrylate
BMA: n-butyl methacrylate
2-EHMA: 2-ethylhexylmethacrylate
2-HEMA: 2-hydroxyethylmethacrylate
BA: n-butyl acrylate
St: styrene
AIBN: $\alpha,\alpha'$-azobisisobutyronitrile
TBPIC: t-butyl peroxyisopropyl carbonate

EXAMPLE 1

A reaction vessel equipped with a stirring device, a condenser, a nitrogen inlet tube and a thermometer was charged with 500 parts of toluene, which was heated at 85° C. A mixture of 90 parts of m-TMI, 235 parts of MMA, 150 parts of BA, 25 parts of 2-HEMA and 5 parts of AIBN was added to the vessel dropwise over a period of 4 hours, during which time the reaction temperature was maintained at 85° to 90° C. The above temperature range was maintained for further two hours, then one part of AIBN was added to the reaction mixture. Then, at an interval of 4 hours, one part each of AIBN was added twice to the reaction mixture. The whole mixture was heated for 18 hours in total to obtain a solution (A) of copolymer containing isocyanate group. This solution contains 50% non-volatile portion, the isocyante group content being 0.45 milli-equivalent/g, whose weight-average molecular weight was 25,000.

On the other hand, in like manner, using 500 parts of toluene, 310 parts of MMA, 150 parts of n-BA and 40 parts of m-TMA, copolymerization was conducted to obtain a copolymer solution(I) containing an amino group. This copolymer solution contains 50% non-volatile portion, the amino group content being 0.23 milli-equivalent/g, whose weight-average molecular weight was 20,000.

200 Parts of a copolymer solution(I) containing an amino group, 100 parts of Tipaque CR-90(titanium oxide, manufactured by Ishihara Sangyo Kaisha Ltd.), 100 parts of toluene and 50 parts of butyl acetate were mixed and dispersed with a sand-mill for 2 hours to obtain a white enamel.

100 Parts of the above-mentioned white enamel and 22 parts of a copolymer (A) containing isocyanate group were mixed and diluted with a mixture solvent of toluene/butyl acetate (2/1). The pot life of this coating was 20 minutes, and spray-coating being possible. This coating was sprayed on a mild steel sheet of 8 mm thick to make the thickness of cured coating film 80 μm, which was left standing at room temperature. The coating film became dry tack in 10 minutes, which was completely cured in one day. The resulting coating film was of 2H in pencil hardness, good in solvent-resistance and good in impact resistance. After 1000 hours of accelerated weathering test (QUV: Q Panel Co. U.S.A.), the ΔE was 1.2,60° and the gloss (60°) retention percentage being 90%.

EXAMPLE 2

A reaction vessel of the same type as described in Example 1 was charged with 500 parts of toluene, 115 parts of MMA, 200 parts of n-BA and 50 parts of m-TMI, and the mixture was heated while introducing thereinto dry nitrogen. When the internal temperature reached 90° C., 67 ml of TBPIC was added to the mixture. About 5 minutes later, a mixture of 65 parts of MMA and 70 parts of m-TMI was added dropwise over a period of 6 hours, then the reaction was allowed to proceed for further 2 hours. When 3 hours elapsed after starting the reaction, 2.4 m( of TBPIC was added to the reaction system. The copolymer solution(B) thus obtained contains 50% non-volatile portion, the isocyanate group content being 0.6 milli-equivalent/g, whose weight-average molecular weight was 20,000.

In the same manner as in Example 1, 500 parts of toluene, 210 parts of MMA, 200 parts of n-BA, 60 parts of St and 30 parts of m-TMA was subjected to copolymerization to obtain a copolymer solution(II) containing an amino group. This copolymer contains 50% non-volatile portion, the amino group content being 0.17 milli-equivalent/g, whose weight-average molecular weight was 22,000.

A mixture of 210 parts of the copolymer solution(L) containing amino group, 90 parts of Tipaque CR-90, 100 parts of toluene and 50 parts of butyl acetate was processed with a sand-mill for 2 hours to obtain a white enamel.

With 100 parts of the above-mentioned enamel was mixed 13 parts of the copolymer solution(B) containing isocyanate group, and the mixture was diluted with a mixture solvent of toluene/butyl acetate(½). The pot life of this coating was 25 minutes, and spray-coating being possible. The coating film obtained by the same manner as in Example 1 has a thickness of 85 μm, which became dry tack in 10 minutes, and time required for complete cure was one day. The resulting film was of 2H in hardness, good in solvent-resistance, impact resistance and weatherability.

EXAMPLE 3

In the same manner as in Example 1, 120 parts of m-TMI, 100 parts of MMA and 230 parts of n-BA was subjected to copolymerization to obtain a copolymer solution(C) containing isocyanate group containing 50% of non-volatile portion and 0.60 milli-equivalent/g of isocyanate group, whose weight-average molecular weight was 20,000.

A mixture of 30 parts of m-TMA, 200 parts of MMA, 160 parts of n-BA, 50 parts of EMA and 50 parts of St was subjected to copolymerization to obtain a copolymer solution (II) containing amino group. This copolymer contains 50% non-volatile portion, the amino group content being 0.17 milli-equivalent/g, whose weight-average molecular weight was 24,000.

In completely the same manner as in Example 2, a white enamel was obtained by using the copolymer solution(II) containing amino group.

A mixture of 100 parts of above-mentioned white enamel and 13 parts of the copolymer solution(C) containing group was diluted with a mixture solvent of toluene/ethylene glycol monoethyl ether acetate (1/1) to the extent of a sprayable viscosity. The pot life of this coating was 25 minutes, and spray-coating being possible. The resulting film obtained by the same manner as in Example 1 has a thickness of 75 μm, which became dry tack in 10 minutes, and the time required for complete cure was 30 hours.

EXAMPLE 4

In the same manner as in Example 1, a mixture of 60 parts of m-TMI, 210 parts of MMA, 150 parts of n-BA, 30 parts of 2-EHMA and 50 parts of St was subjected to copolymerization to obtain a copolymer solution(D) containing isocyanate group, whose non-volatile content was 50%, isocyanate group content was 0.3 milliequivalent/g and weight-average molecular weight was 26,000.

To 100 parts of the white enamel of Example 3 was added 26 parts of the copolymer solution(D) containing isocyanate group, and the mixture was diluted with a mixture of toluene/methyl isobutylketone (1/1) to the extent of a sprayable viscosity. The pot life of this coating was 40 minutes, and spray-coating being possible. The resulting film obtained by the same manner as in Example 1 has a thickness of 70 μm, which became dry tack in 15 minutes, and the time required for complete cure was 2 days.

Comparative Example 1

A reaction vessel fitted with a thermometer, a stirring device and a nitrogen-introducing tube was charged with 780 parts of polyethylene propylene adipate(ethylene/propylene =8/2), which was heated at 90° C. for one hour while blowing thereinto dry nitrogen. To the reaction mixture was added dropwise 220 parts of molten 4,4′-diisocyanate dicyclohexyl methane over a period of one hour while keeping the temperature at 90° C., followed by heating for one hour to obtain a prepolymer containing 83 milli-equivalent/g of isocyanate. In a mixture of 30 parts of toluene and 30 parts of butyl acetate was diluted 100 parts of the above-mentioned prepolymer to obtain a solution whose isocyanate group content was 0.52 milli-equivalent/g. To 100 parts of this solution was added 40 parts of ethylene glycol monoethyl ether acetate. To thus diluted material was added 10 parts of a 37% ethyl acetate solution of 1,3-bis-(aminomethyl)cyclohexane, and the mixture hardened instantly, thus coating being impossible.

COMPARATIVE EXAMPLE 2

A mixture of 37 parts of 1,3-bis(aminomethyl)cyclohexane and 63 parts of methyl ethyl ketone was heated for one hour under reflux.

100 Parts of the prepolymer solution of Comparative Example 1 was diluted with 40 parts of methyl isobutyl ketone, to which was added 10 parts of the above-mentioned amine solution to prepare a coating solution. The pot life of this coating was 20 minutes, and the coating film obtained by spray-coating in the same manner as in Example 1 has a thickness of 70 μm, and the time required for becoming dry tack was one hour.

What is claimed is:

1. A resin composition, which comprises (a) a copolymer containing isocyanate group prepared by subjecting a compound represented by the general formula:

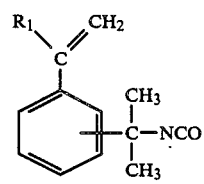

wherein $R_1$ stands for hydrogen or methyl group and an ethylenic unsaturated monomer to copolymerization, and (b) a copolymer containing amino group prepared by subjecting a compound represented by the general formula:

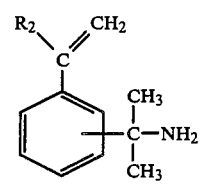

wherein $R_2$ stands for hydrogen or methyl group and an ethylenic unsaturated monomer to copolymerization.

2. The resin composition as claimed in claim 1, wherein the copolymer (a) is one prepared by subjecting isopropenyl-α,α-dimethylbenzylisocyanate to copolymerization.

3. The resin composition as claimed in claim 1, wherein the ratio of the compound represented by the general formula:

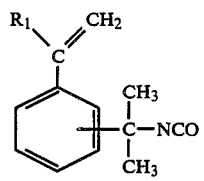

wherein $R_1$ stands for hydrogen or methyl group in the copolymer (a) is within the range of from about 2 to 30 weight %.

4. The resin composition as claimed in claim 1, wherein the copolymer (b) is one prepared by subjecting isopropenyl-α,α-dimethylbenzylamine to copolymerization.

5. The resin composition as claimed in claim 1, wherein the ratio of the compound represented by the general formula:

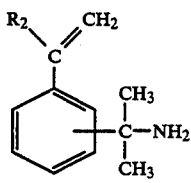

wherein $R_2$ stands for hydrogen or methyl group in the copolymer (b) is within the range of from about 2 to 30 weight %.

6. The resin composition as claimed in claim 1, wherein each of the copolymers (a) and (b) is one having weight-average molecular weight of from about 1,000 to about 500,000.

7. The resin composition as claimed in claim 1, wherein the mixture ratio of the copolymer (a) with the copolymer (b) is that the equivalent ratio of the isocyanate group in the copolymer (a) and the amino group in the copolymer (b) is from about 0.5 to about 2.0.

8. A copolymer containing amino group, which is prepared by subjecting a compound represented by the general formula:

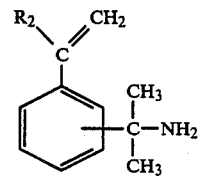

wherein $R_2$ stands for hydrogen or methyl group and an ethylenic unsaturated monomer to copolymerization.

* * * * *